United States Patent
Mizuno

(10) Patent No.: US 8,311,392 B2
(45) Date of Patent: Nov. 13, 2012

(54) IMAGE PROCESSING APPARATUS, IMAGE PROCESSING METHOD, AND STORAGE MEDIUM

(75) Inventor: Ryosuke Mizuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 256 days.

(21) Appl. No.: 12/771,498

(22) Filed: Apr. 30, 2010

(65) Prior Publication Data

US 2010/0303374 A1    Dec. 2, 2010

(30) Foreign Application Priority Data

Jun. 1, 2009   (JP) ................................ 2009-132424

(51) Int. Cl.
*H04N 5/94* (2006.01)

(52) U.S. Cl. ........................................ 386/264; 386/263

(58) Field of Classification Search ........................ None
See application file for complete search history.

(56) References Cited

U.S. PATENT DOCUMENTS

| 7,098,959 B2 | 8/2006 | Mishima et al. |
| 2006/0227249 A1 | 10/2006 | Chen et al. |

FOREIGN PATENT DOCUMENTS

| JP | 6-70288 A | 3/1994 |
| JP | 2002-351382 A | 12/2002 |
| JP | 2004-159294 A | 6/2004 |

*Primary Examiner* — William C Vaughn, Jr.
*Assistant Examiner* — Eileen Adams
(74) *Attorney, Agent, or Firm* — Fitzpatrick, Cella, Harper & Scinto

(57) ABSTRACT

According to one aspect of the invention, an image processing apparatus comprises: a unit configured to obtain an input image and a subsequent image; a unit configured to obtain N replicated images from the input image; a generating unit configured to generate a low-frequency enhanced image; a subtraction unit configured to generate a high-frequency enhanced image; a synthesizing unit configured to generate a high-frequency output image; and an output unit configured to select and output one of the low-frequency enhanced image and the high-frequency output image. The generating unit comprises a unit configured to obtain a motion vector of an object, and a filter unit configured to apply the filter to pixels around a specified pixel position Q in the replicated image, to obtain a pixel value at a pixel position P in the low-frequency enhanced image.

9 Claims, 14 Drawing Sheets

| | | -3 | -2 | -1 | 0 | 1 | 2 | 3 |
|---|---|---|---|---|---|---|---|---|
| | 1 | 0 | 1 | 2 | 4 | 2 | 1 | 0 |
| | 2 | 1 | 2 | 6 | 8 | 6 | 2 | 1 |
| | 3 | 2 | 6 | 8 | 16 | 8 | 6 | 2 |
| y-COORDINATE | 0 | 4 | 8 | 16 | 32 | 16 | 8 | 4 |
| | -1 | 2 | 6 | 8 | 16 | 8 | 6 | 2 |
| | -2 | 1 | 2 | 6 | 8 | 6 | 2 | 1 |
| | -3 | 0 | 1 | 2 | 4 | 2 | 1 | 0 | x-COORDINATE (above table)

F I G. 6
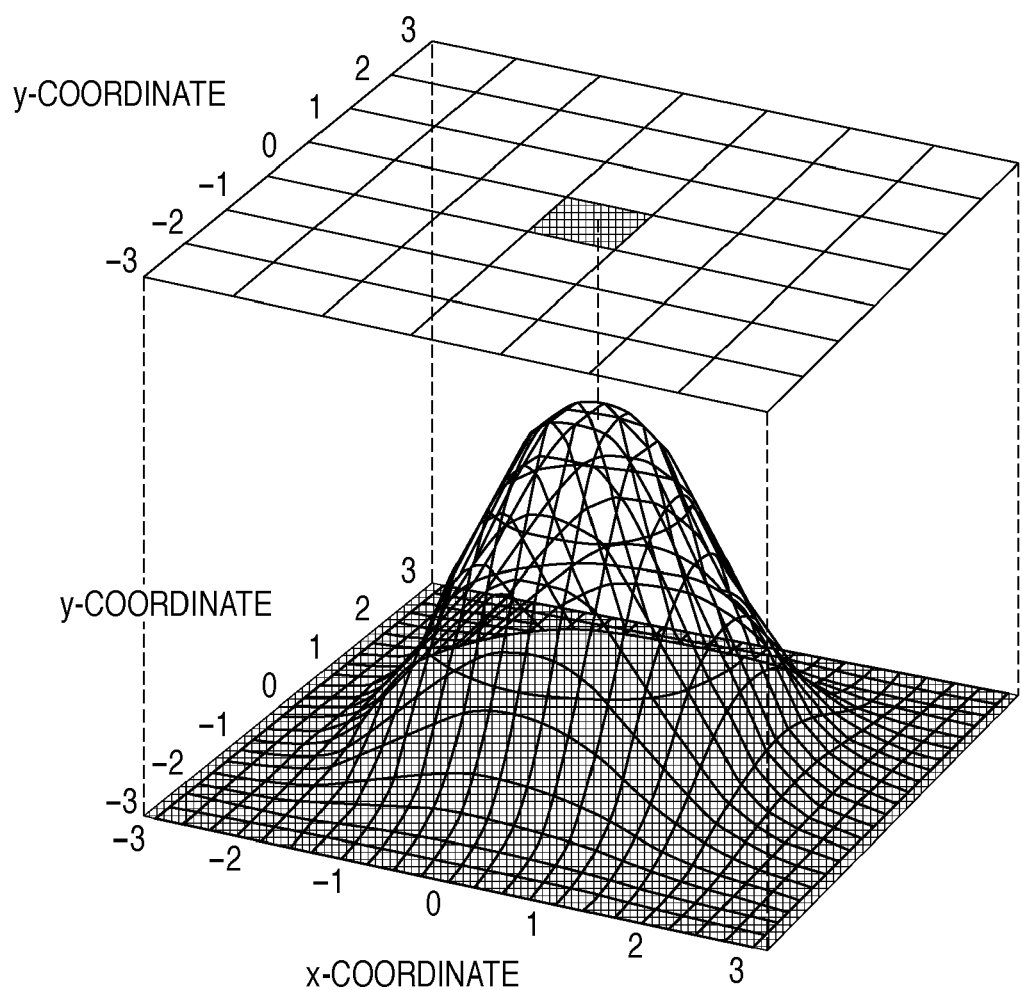

FIG. 7

|  | x-COORDINATE | | | | | | |
|---|---|---|---|---|---|---|---|
|  | −3 | −2 | −1 | 0 | 1 | 2 | 3 |
| 3 | 0 | 0 | 0 | 0 | 0 | 0 | 0 |
| 2 | 0 | 1 | 2 | 4 | 2 | 1 | 0 |
| 1 | 0 | 2 | 4 | 10 | 4 | 2 | 0 |
| 0 | 0 | 4 | 10 | 16 | 10 | 4 | 0 |
| −1 | 0 | 2 | 4 | 10 | 4 | 2 | 0 |
| −2 | 0 | 1 | 2 | 4 | 2 | 1 | 0 |
| −3 | 0 | 0 | 0 | 0 | 0 | 0 | 0 | y-COORDINATE

F I G. 8
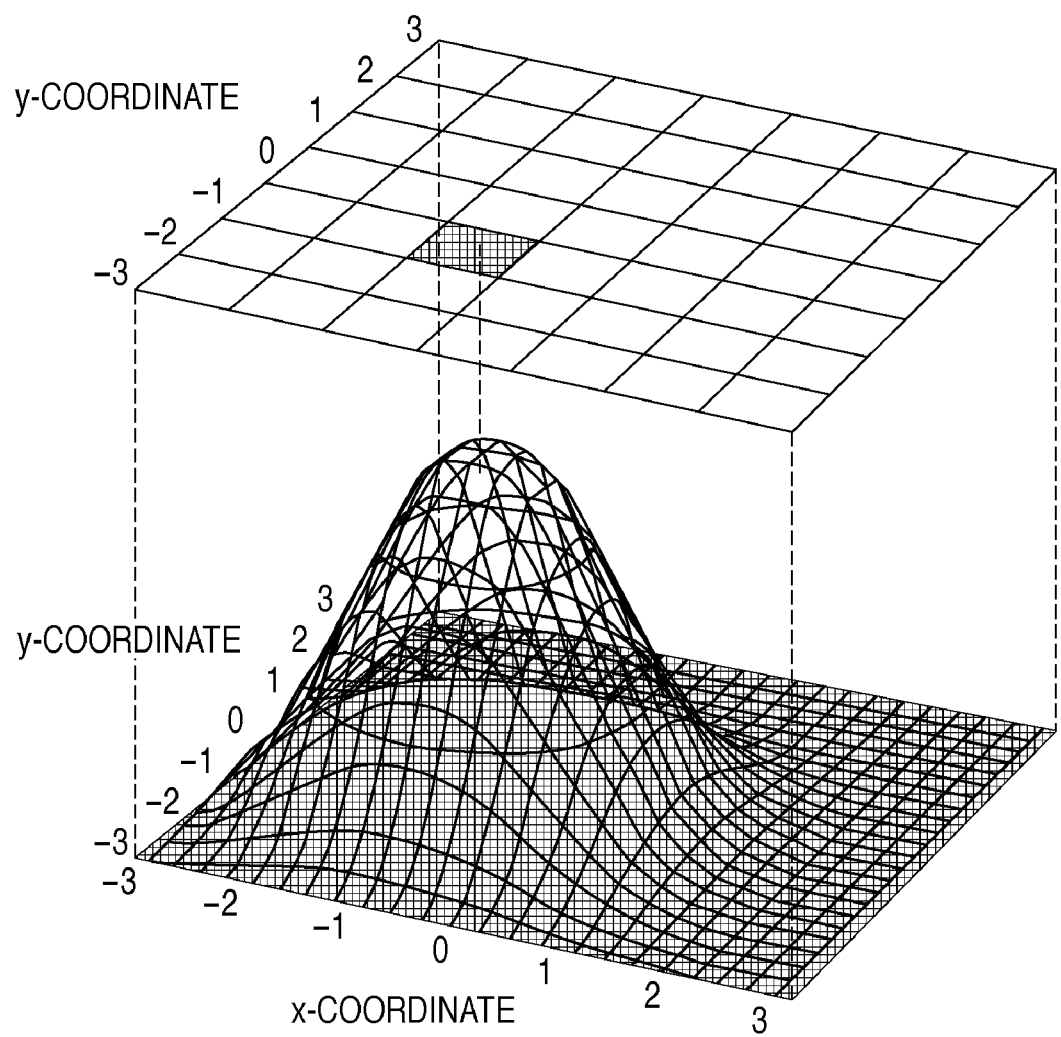

FIG. 9 x-COORDINATE

|  | | −3 | −2 | −1 | 0 | 1 | 2 | 3 |
|---|---|---|---|---|---|---|---|---|
| | 3 | 0 | 0 | 0 | 0 | 0 | 0 | 0 |
| | 2 | 0 | 0 | 0 | 0 | 0 | 0 | 0 |
| | 1 | 1 | 2 | 4 | 2 | 1 | 0 | 0 |
| y-COORDINATE | 0 | 2 | 4 | 10 | 4 | 2 | 0 | 0 |
| | −1 | 4 | 10 | 16 | 10 | 4 | 0 | 0 |
| | −2 | 2 | 4 | 10 | 4 | 2 | 0 | 0 |
| | −3 | 1 | 2 | 4 | 2 | 1 | 0 | 0 |

IMAGE PROCESSING APPARATUS, IMAGE PROCESSING METHOD, AND STORAGE MEDIUM

BACKGROUND OF THE INVENTION

1. Field of the Invention

The present invention relates to an image display technique for improving a moving image resolution.

2. Description of the Related Art

Recently, commercially available moving image display apparatus for television and the like include so-called liquid crystal displays, plasma displays, and FED displays as well as CRTs. Thus, there are various moving image display apparatus. Each type of moving image display apparatus is designed to reduce motion blurring and flicker by N-folding the frame frequency (frame rate) of an input image signal (that is, dividing one frame into N subframes) and then displaying the resultant image.

The user of a display apparatus designed to emit light almost all the time in a frame time, for example, a hold-type display apparatus, observes relatively large motion blurring. When the user pursues (follows an area of motion in a moving image with his/her gaze), he/she observes larger motion blurring with an increase in the period of light emission in a frame time. Flicker tends to be observed in synchronism with frames in a display apparatus, for example, an impulse-type display apparatus, in which the temporal unevenness of light intensity is large because the period of light emission in a frame time is very short.

In contrast to this, when a 60-Hz input image signal is displayed after the frame frequency is doubled (N=2, so-called double-speeding) into 120 Hz, the period of light emission in one frame is reduced to half, and hence the motion blurring is reduced to about half. In addition, with regard to flicker, doubling the frame frequency into 120 Hz can make the frequency of flicker synchronized with frames fall out of the range of the response characteristics of human vision. This can therefore make it difficult to observe flicker.

There are two main methods to increase a frame frequency. The first method estimates an image between two frames by detecting the motion vector of an object in an original image. In general, this method is called, for example, an intermediate image generating method based on motion compensation, which is disclosed in, for example, Japanese Patent Laid-Open No. 2004-159294. The first method is expressed as "frame (field) interpolation based on motion compensation".

According to the second method, performing filter processing for an input image for each frame will split the image into high spatial frequency components (high-frequency components) greatly associated with motion blurring and low spatial frequency components (low-frequency components) greatly associated with flicker. High-frequency components are concentrated and displayed on one subframe (one of two double-speed frames corresponding to an original frame). Low-frequency components are concentrated and displayed on one subframe or distributed and displayed on the two subframes. As the second method, for example, the methods disclosed in Japanese Patent Laid-Open Nos. 6-70288 and 2002-351382 and U.S. Patent Laid-Open No. 2006/0227249 each are available. In this specification, this second scheme is expressed as a scheme of splitting an image into a plurality of spatial frequency components and displaying the respective frequency components after distributing them to one or a plurality of subframes, and will be briefly expresses as "spatial frequency splitting".

As shown in FIG. 13, the method disclosed in Japanese Patent Laid-Open No. 6-70288 temporarily stores an input field image in two field memories while switching the field memories, thus forming two double-speed subframes. The speed of an original signal is doubled by alternatively switching these subframes at the rate double the input frequency by using a switch SW0. At this time, this method performs the processing of suppressing high spatial frequency components for one double-speed subframe. As a result, the double-speed subframe having undergone the processing of suppressing high-frequency components (expressed by "SL" in FIG. 13) contains relatively fewer high-frequency components. The other double-speed subframe (expressed by "SH" in FIG. 13) contains relatively more high-frequency components. This makes it possible to localize high-frequency components on one double-speed subframe in an output image.

As shown in FIG. 14, according to the method disclosed in Japanese Patent Laid-Open No. 2002-351382, a frame converter doubles the speed of an input image, and a filter LPF/HPF splits the image into low-frequency components Low and high-frequency components High. In addition, the high-frequency components High are multiplied by a gain α for each double-speed subframe. The sign of α is changed for each double-speed subframe by setting positive α for one double-speed subframe and negative α for the other double subframe. If it is determined that the motion of an image is large, the absolute value of α may be increased. This makes it possible to localize high-frequency components on one double-speed subframe SH.

As shown in FIG. 15, the method disclosed in U.S. Patent Laid-Open No. 2006/0227249 generates high-frequency component data H by applying a filter HPF to an input image. In addition, adding the high-frequency component data H to the input image will generate high-frequency output image data SH. Subtracting the high-frequency component data H from an input image A will generate low-frequency image data SL. Switching these data at a frequency double the frame frequency of the input image using the switch SW0 can output a double-speed image one of whose subframe has localized high-frequency components.

The first method "frame (field) interpolation based on motion compensation" has the problem that since it requires the processing of generating an intermediate image by using the image data of adjacent frames, a large amount of calculation is required. The second method "spatial frequency splitting" has the problem that since displayed images of the first and second subframes do not properly reflect the difference of each time to be displayed, an image lag (tail-blurring) occurs in an area with motion.

SUMMARY OF THE INVENTION

According to the present invention, it is possible to reduce an image lag in an area with motion which is caused when an image is displayed at a double speed by using conventional "spatial frequency splitting", with a smaller amount of calculation than that required by conventional "frame (field) interpolation based on motion compensation".

According to one aspect of the invention, an image processing apparatus which processes a moving image comprising successive frame images comprises: a unit configured to obtain a frame image of interest as an input image, and to obtain a frame image subsequent to the frame image of interest as a subsequent image; a unit configured to obtain N replicated images from the input image; a generating unit configured to generate a low-frequency enhanced image whose low-frequency component is enhanced, from the replicated image by using a filter for enhancing a low-frequency component; a subtraction unit configured to generate a high-frequency enhanced image whose high-frequency component is enhanced, from the low-frequency enhanced image and the replicated image; a synthesizing unit configured to generate a high-frequency output image by synthesizing the high-frequency enhanced image and the low-frequency enhanced image at a predetermined ratio; and an output unit configured to select and output one of the low-frequency enhanced image and the high-frequency output image in place of each of the replicated images, the generating unit comprising a unit configured to obtain a motion vector of an object depicted in the input image and the subsequent image, and a filter unit configured to generate the low-frequency enhanced image, when processing a pixel at a pixel position P in the replicated image, by performing, for each pixel position in the replicated image, a process of specifying a pixel position Q spaced apart from the pixel position P in the replicated image by a predetermined distance in an opposite direction to the motion vector, a process of applying the filter to pixels around the specified pixel position Q in the replicated image, to obtain a pixel value at the pixel position P in the low-frequency enhanced image.

Further features of the present invention will become apparent from the following description of exemplary embodiments (with reference to the attached drawings).

BRIEF DESCRIPTION OF THE DRAWINGS

FIG. 6 is a view showing an example of filter coefficients used in the first embodiment;

FIG. 7 is a view showing an example of filter coefficients used in the first embodiment;

FIG. 8 is a view showing an example of filter coefficients used in the first embodiment;

FIG. 9 is a view showing an example of filter coefficients used in the first embodiment;

DESCRIPTION OF THE EMBODIMENTS

The embodiments of the present invention will be described below with reference to the accompanying drawings. However, the scope of the present invention is not limited to the following embodiments.

First Embodiment

Figure 1:
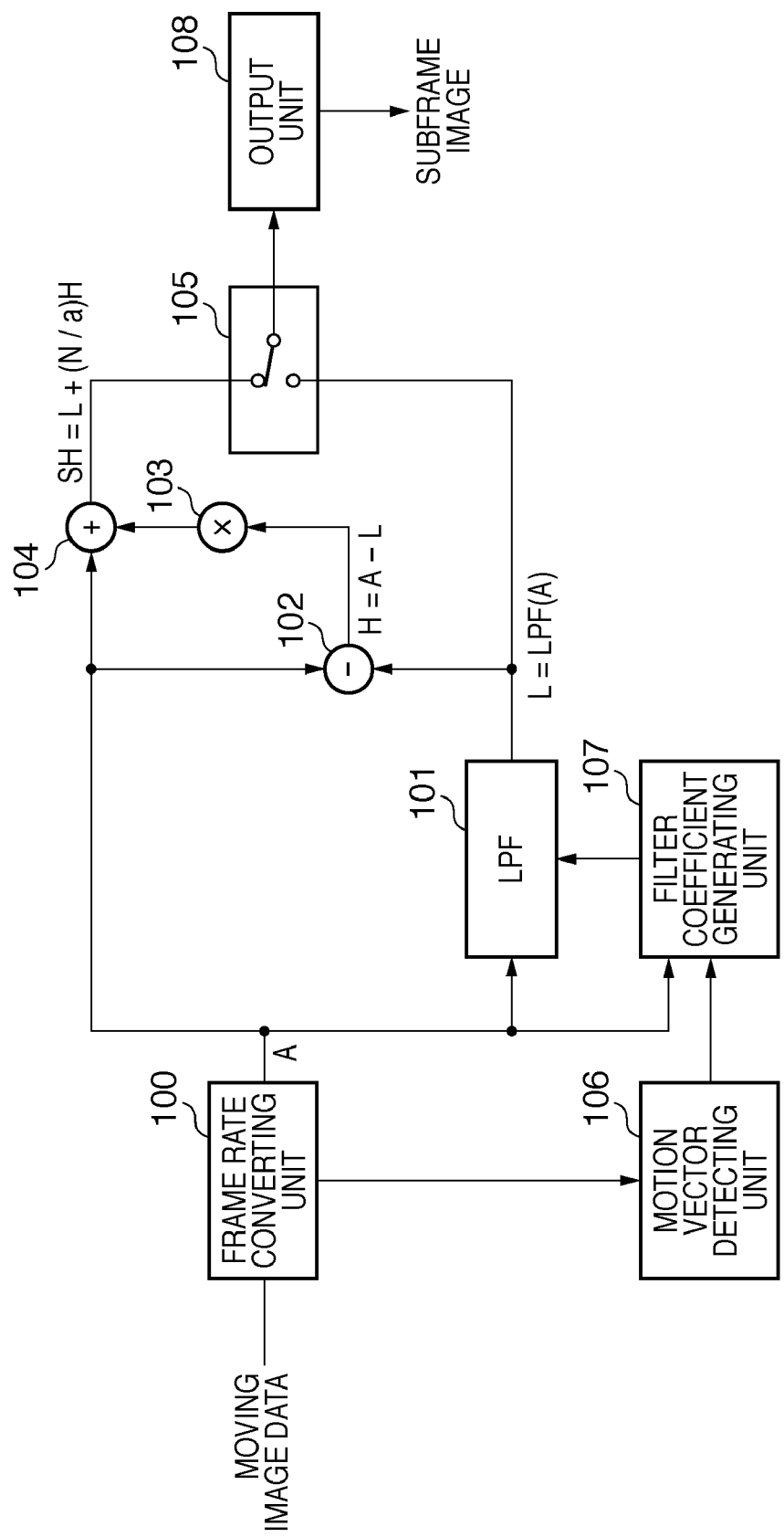
FIG. 1 is a block diagram showing the arrangement of an image display apparatus according to the first embodiment.

FIG. 1 is a block diagram showing the arrangement of an image display apparatus according to the first embodiment. Referring to FIG. 1, reference numeral 100 denotes a frame rate converting unit; 101, a low-pass filter (to be referred to as an LPF hereafter); 102, a subtracter; 103, a multiplier; 104, an adder; 105, a switch; 106, a motion vector detecting unit; 107, a filter coefficient generating unit; and 108, an output unit.

The frame rate converting unit 100 acquires moving image data in one frame unit, and generates N subframe images from one frame image. More specifically, the frame rate converting unit 100 includes a frame memory (not shown), and stores input moving image data as an input image in the frame memory on a frame basis. The frame rate converting unit 100 then generates N subframe images as replicated images by reading one frame image of interest (input image) N times at the N times higher frequency than input video data. Assume that in this case, one subframe image generated by the frame rate converting unit 100 is denoted by reference symbol A. The frame rate converting unit 100 sequentially outputs the subframe image A to the LPF 101, the subtracter 102, and the adder 104. A coefficient N which defines the number of subframe images may be determined in advance and set to the apparatus according to this embodiment, or may be acquired from outside the apparatus.

The LPF 101 is a two-dimensional low-pass filter. The LPF 101 cuts off the upper limit spatial frequency from the subframe image A generated by the frame rate converting unit 100 by processing the image using a filter, thereby generating a low-frequency enhanced image L whose low-frequency components are enhanced. The LPF 101 acquires filter coefficients used by itself from the filter coefficient generating unit 107.

Figures 2, 3:
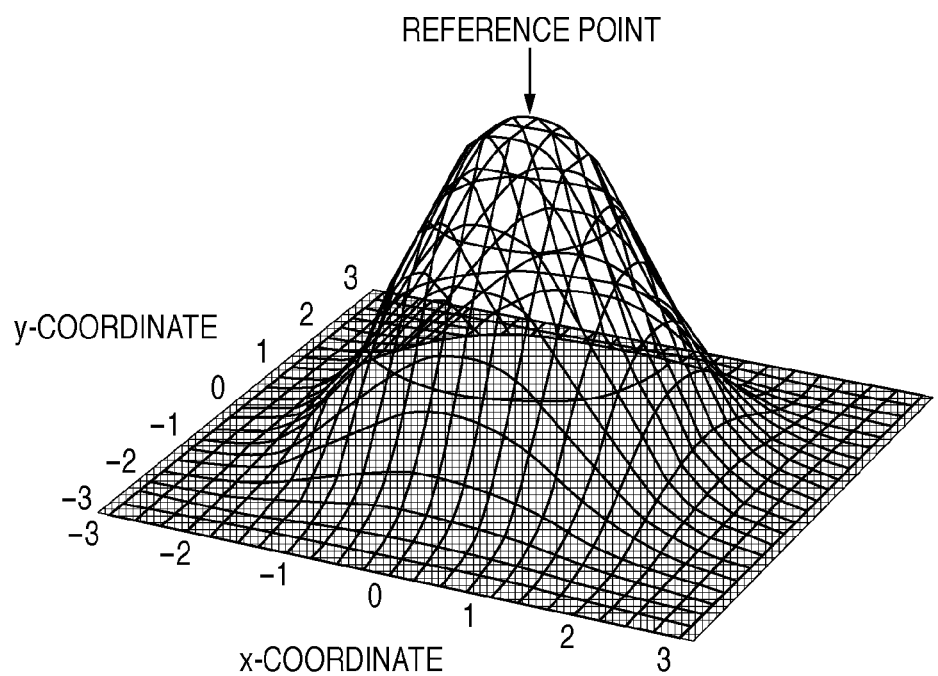
FIG. 2 is a view for explaining an example of a filter function used in the first embodiment.
FIG. 3 is a view showing an example of filter coefficients used in the first embodiment.

This embodiment uses a filter function based on a Gaussian function as a low-pass filter. However, the type of filter as a base is not specifically limited. For example, it is possible to use a Gaussian function or a filter which provides a moving average or a weighted moving average. FIG. 2 is a view for explaining an example of the filter function used by the LPF 101. FIG. 2 schematically shows the filter function generated based on a Gaussian function. The filter function in FIG. 2 plots a normal distribution in which the center of the weight is placed on the reference point.

The operation of the LPF 101 will be described in detail below. FIG. 3 shows an example of the filter coefficients used by the LPF 101. Referring to FIG. 3, the filter size (so-called kernel size) is 7×7 pixels. Note, however, that the filter size and filter coefficients are merely examples, and any filter size and filter coefficients may be used. In this case, filter coefficients are so-called kernel values before normalization.

Filter processing for one pixel of interest in a subframe image will be described first. Assume that in this case, a pixel value A of coordinates (x, y) in the i:th subframe image generated from one frame image is represented by $A_i(x, y)$. First of all, the coordinates of a pixel of interest are represented by $A_i(0, 0)$. The LPF 101 performs filter computation for a subframe image by using the filter coefficients shown in FIG. 3. In an example using the filter coefficients in FIG. 3, $LPF(A_i(0, 0))$ as an LPF output value of the pixel of interest $A_i(0, 0)$ is determined based on equation (1):

$$LPF(A_{n(0,0)}) = \frac{1}{256} \begin{pmatrix} 0 & 1 & 2 & 4 & 2 & 1 & 0 \\ 1 & 2 & 6 & 8 & 6 & 2 & 1 \\ 2 & 6 & 8 & 16 & 8 & 6 & 2 \\ 4 & 8 & 16 & 32 & 16 & 8 & 4 \\ 2 & 6 & 8 & 16 & 8 & 6 & 2 \\ 1 & 2 & 6 & 8 & 6 & 2 & 1 \\ 0 & 1 & 2 & 4 & 2 & 1 & 0 \end{pmatrix} \begin{pmatrix} A_{n(-3,-3)} & A_{n(-2,-3)} & A_{n(-1,-3)} & A_{n(0,-3)} & A_{n(1,-3)} & A_{n(2,-3)} & A_{n(3,-3)} \\ A_{n(-3,-2)} & A_{n(-2,-2)} & A_{n(-1,-2)} & A_{n(0,-2)} & A_{n(1,-2)} & A_{n(2,-2)} & A_{n(3,-2)} \\ A_{n(-3,-1)} & A_{n(-2,-1)} & A_{n(-1,-1)} & A_{n(0,-1)} & A_{n(1,-1)} & A_{n(2,-1)} & A_{n(3,-1)} \\ A_{n(-3,0)} & A_{n(-2,0)} & A_{n(-1,0)} & A_{n(0,0)} & A_{n(1,0)} & A_{n(2,0)} & A_{n(3,0)} \\ A_{n(-3,1)} & A_{n(-2,1)} & A_{n(-1,1)} & A_{n(0,1)} & A_{n(1,1)} & A_{n(2,1)} & A_{n(3,1)} \\ A_{n(-3,2)} & A_{n(-2,2)} & A_{n(-1,2)} & A_{n(0,2)} & A_{n(1,2)} & A_{n(2,2)} & A_{n(3,2)} \\ A_{n(-3,3)} & A_{n(-2,3)} & A_{n(-1,3)} & A_{n(0,3)} & A_{n(1,3)} & A_{n(2,3)} & A_{n(3,3)} \end{pmatrix} \quad (1)$$

The respective pixels constituting one subframe image are sequentially set as pixels of interest and processed according to equation (1), thereby sequentially obtaining LPF output values for each pixel of interest. The image obtained by updating the pixel values of interest of the subframe image with the LPF output values is acquired as a low-frequency enhanced image. In this case, the pixels of interest may be all the pixels of the subframe image or may be some pixels of the subframe image. This embodiment performs filter processing for all the pixels of a subframe image. Therefore, in the processing in which the motion vector detecting unit 106 and the filter coefficient generating unit 107 generate filter coefficients, the motion vector detecting unit 106 and the filter coefficient generating unit 107 also set all the pixels of an image sequentially as pixels of interest. When the LPF 101 is to perform filter processing for some pixels of an image, the motion vector detecting unit 106 and the filter coefficient generating unit 107 may set a portion of the image as a portion of interest.

The motion vector detecting unit 106 acquires an input image from the frame rate converting unit 100. The motion vector detecting unit 106 acquires the image of a frame adjacent and subsequent to the input image, stored in the frame rate converting unit 100, as a subsequent image. The motion vector detecting unit 106 obtains the motion vector of an object depicted in the input image and the subsequent image, from the input image and the subsequent image. Finally, the motion vector detecting unit 106 estimates a motion vector corresponding to the input image for each pixel of the input image. The motion vector detecting unit 106 outputs the motion vector corresponding to each pixel of the input image to the filter coefficient generating unit 107.

The filter coefficient generating unit 107 generates a filter coefficient for each pixel of the input image by using a motion vector. The filter coefficient generating unit 107 outputs the generated filter coefficient to the LPF 101. In this embodiment, the filter coefficient generating unit 107 acquires filter coefficients by moving a filter function. This processing allows the filter to be applied to pixels around a pixel position Q, where the position Q is spaced apart from a pixel position P in the input image which corresponds to a pixel position P of interest in the replicated image by a predetermined distance in the direction opposite to the motion vector. The motion vector detecting unit 106 and the filter coefficient generating unit 107 will be described in detail later.

The subtracter 102 subtracts each pixel value of the low-frequency enhanced image L generated by the LPF 101 from each pixel value of the input image according to equation (2). In this manner, the subtracter 102 newly generates a high-frequency enhanced image H whose high-frequency components are enhanced.

$$H = A - L \quad (2)$$

The multiplier 103 determines the amount of high-frequency components to be distributed to each subframe image. More specifically, the multiplier 103 generates a high frequency distribution image DH by multiplying each pixel value of the high-frequency enhanced image H by (N−a)/a. The multiplier 103 then outputs the high frequency distribution image DH to the adder 104. As described above, the coefficient N is the number of subframe images generated from one frame image. The coefficient a indicates the number of subframe images in which the high-frequency enhanced images H are located. That is, the apparatus according to this embodiment outputs a high-frequency enhanced images which correspond to a one-frame input image. The coefficient a may be determined in advance and set to the apparatus according to this embodiment or may be externally acquired.

The adder 104 adds each pixel value of the high frequency distribution image DH generated by the multiplier 103 to each pixel value of the input image. In this manner, the adder 104 generates a new high-frequency output image SH. The adder 104 performs computation according to equation (3):

$$SH = A + \{(N-a)/a\}H = L + (N/a)H \quad (3)$$

As a result of the processing performed by the multiplier 103 and the adder 104, the high-frequency output image SH output from the adder 104 becomes an image obtained by adding a high-frequency enhanced image to a low-frequency enhanced image at a predetermined ratio (N/a).

Figure 4:
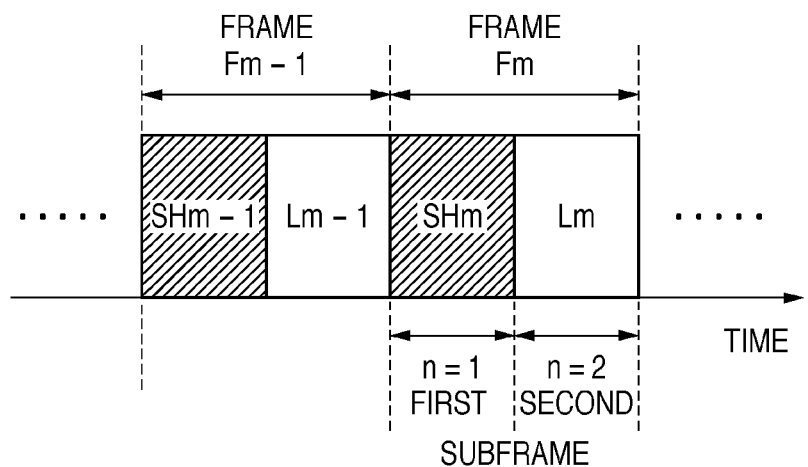
FIG. 4 is a view showing an example of a double-speed (N=2) subframe image display sequence in the first embodiment.

The switch 105 selects either the low-frequency enhanced image L generated by the LPF 101 or the high-frequency output image SH generated by the adder 104. The switch 105 outputs the selected image in place of the replicated image. FIG. 4 is a view for explaining the display sequence of subframe images in double speed (N=2) in this embodiment. In the example in FIG. 4, the frame image of the m:th frame Fm is converted into two (N=2) subframe images. In addition, in the example in FIG. 4, the high-frequency enhanced image H is located in one subframe image (a=1).

As shown in FIG. 4, the switch 105 outputs a high-frequency output image SHm and a low-frequency enhanced image Lm as the first and second subframe images, respectively. A method by which the switch 105 selects either the low-frequency enhanced image L or the high-frequency output image SH is not specifically limited. The switch 105 may select low-frequency enhanced images L and high-frequency output images SH so as to make their output intervals become uniform. Alternatively, the switch 105 may select high-frequency output images SH a times consecutively, and then select low-frequency enhanced images L (N−a) times consecutively.

The motion vector detecting unit 106 and the filter coefficient generating unit 107 will be described in detail below. The motion vector detecting unit 106 estimates how much an object depicted in an m:th frame image Fm has moved on an (m+1)th frame image Fm+1. The motion vector detecting unit 106 acquires a motion vector concerning each pixel constituting the frame image Fm.

Figure 5:
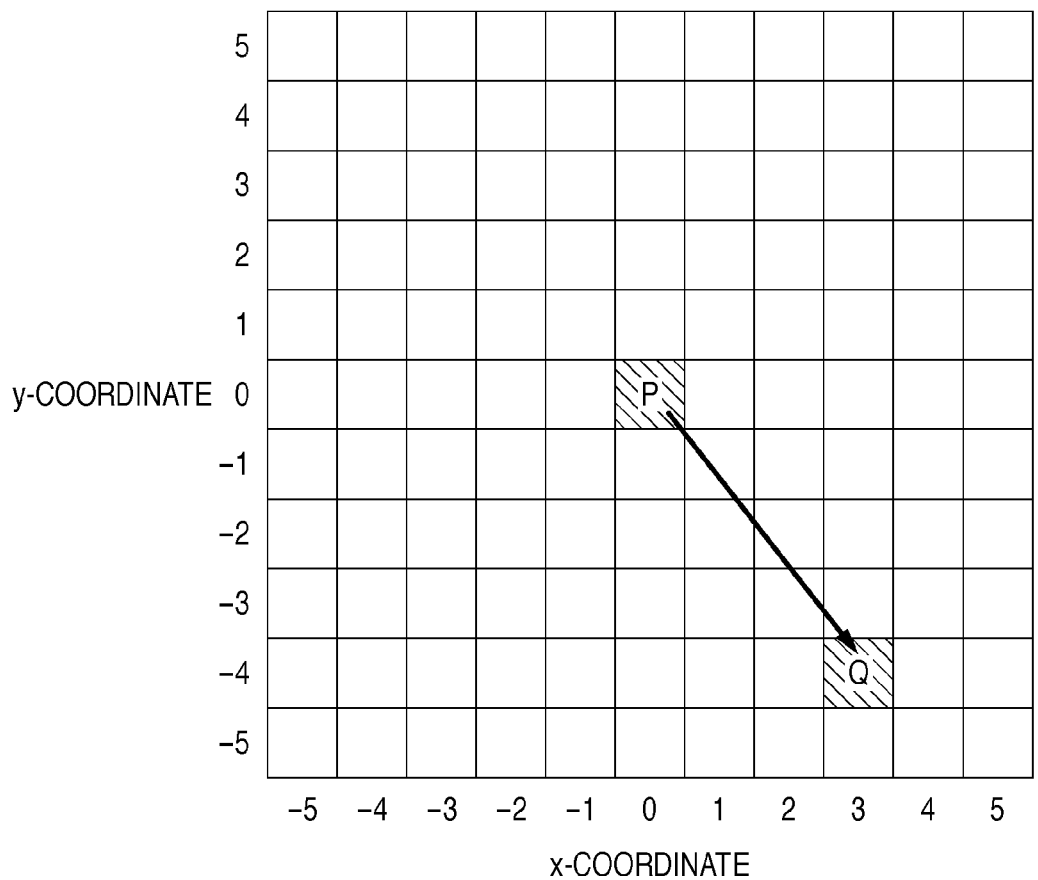
FIG. 5 is a graph for explaining a motion vector used in the first embodiment.

FIG. 5 is a graph for explaining a motion vector according to this embodiment. FIG. 5 shows an image of 11×11 pixels centered on a pixel of interest (represented by P in FIG. 5) in the m:th frame image Fm. When the motion vector detecting unit 106 estimates that the pixel of interest (represented by P in FIG. 5) has moved to the coordinates ((x, y)=(3, −4)) of Q shown in FIG. 5 in the (m+1)th input frame image Fm+1, a motion vector V(x, y) of P is (+3, −4). Vx=+3 represents a motion vector in the x direction; and Vy=−4, a motion vector in the y direction.

When Vx has the sign "+", Vx indicates movement in the x-axis positive direction in FIG. 5. When Vx has the sign "−", Vx indicates movement in the x-axis negative direction in FIG. 5. When Vy has the sign "+", Vy indicates movement in the y-axis positive direction in FIG. 5. When Vy has the sign "−", Vy indicates movement in the y-axis negative direction in FIG. 5. The absolute value of each numerical value indicates a moving amount (the number of pixels of movement).

When the motion vector detecting unit 106 estimates that an object indicated by a pixel of interest has no movement, the motion vector detecting unit 106 outputs motion vector V(x, y)=(0, 0). Likewise, when a scene change occurs between frames, motion vector detecting unit 106 can output motion vector V(x, y)=(0, 0). The definition of the motion vector V(x, y) in this case is merely an example. A motion vector may indicate an approximate direction and distance (the number of pixels) in and by which a pixel of interest has moved between input frames.

The motion vector detecting unit 106 sequentially sets each pixel of the frame image Fm as a pixel of interest and sequentially acquires the motion vector of each pixel of interest. In the description of this embodiment, in order to comprehensibly express the relationship between a motion vector and coordinate information, a coordinate system is sequentially converted such that the coordinates of a pixel of interest are represented by ((x, y)=(0, 0)). The filter coefficient generating unit 107 acquires the motion vector V(x, y) obtained by the motion vector detecting unit 106.

The filter coefficient generating unit 107 generates filter coefficients used by the LPF 101 in filter computation. The filter coefficient generating unit 107 outputs the generated filter coefficients to the LPF 101. The filter coefficient generating unit 107 generates filter coefficients based on the motion vector V(x, y) obtained by the motion vector detecting unit 106, the number N of subframe images for one frame image, and a number i of a subframe image subjected to filter computation. The filter coefficient generating unit 107 prepares one numerical value set used by the LPF 101 for each pixel contained in a subframe image. That is, the filter coefficient generating unit 107 prepares numerical value sets equal in number to the number of pixels of a subframe image. The filter coefficient generating unit 107 outputs the prepared numerical sets as filter coefficients. This processing will be described in detail below.

The subframe image numbers i are the numbers assigned to subframe images in the order of display. For example, in double-speeding (N=2), as shown in FIG. 4, the subframe image to be displayed first is represented by i=1, and the subframe image to be displayed second is represented by i=2 ($1 \leq i \leq N$). As described above for example, the values of the filter function generated based on a Gaussian function form a normal distribution in which the center of the weight is placed on the reference point. In this embodiment, the filter coefficient generating unit 107 determines a reference point based on the motion vector (x, y), the subframe image count N, and the subframe image number i.

In this case, the filter coefficient generating unit 107 sets one pixel of a subframe image as a pixel of interest. Based on equations (4), the filter coefficient generating unit 107 then calculates coordinates (X, Y) of a reference point of the filter function applied to the pixel of interest.

$$X=(i-1)\times((-Vx/N))$$

$$Y=(i-1)\times((-Vy/N)) \quad (4)$$

At this time, the coordinates (0, 0) are the central coordinates of the filter function. Let Vx be the x component of the motion vector V(x, y), and Vy be the y component of the vector.

For example, when motion vector V(x, y)=(+3, −6) and N=2, the coordinates of the reference point of the first subframe image (i=1) are given as coordinates (X, Y)=(0, 0), and the coordinates of the reference point of the second subframe image (i=2) are given as coordinates (X, Y)=(−1.5, 3) according to equations (4). In addition, for example, when motion vector V(x, y)=(+3, −6) and N=3, the coordinates of the reference point of the first subframe image (i=1) are given as coordinates (X, Y)=(0, 0), the coordinates of the reference point of the second subframe image (i=2) are given as coordinates (X, Y)=(−1, 2), and the coordinates of the reference point of the third subframe image (i=3) are given as coordinates (X, Y)=(−2, 4).

A case in which motion vector V(x, y)=(+2, +2) and N=2 will be described in more detail. With the application of equations (4), the coordinates of the reference point of the first subframe image (i=1) are given as coordinates (X, Y)=(0, 0), and the coordinates of the reference point of the second subframe image (i=2) are given as coordinates (X, Y)=(−1, −1). A method of calculating filter coefficients used for the first and second subframe images will be described below with reference to FIGS. 6 to 9.

FIG. 6 shows an example of a filter function according to this embodiment. FIG. 6 schematically shows the filter function to be applied to the first subframe image (i=1) when motion vector V(x, y)=(+2, +2) and N=2. FIG. 7 shows an example of filter coefficients in this embodiment. FIG. 7 shows the filter coefficients for the first subframe image (i=1) when motion vector V(x, y)=(+2, +2) and N=2.

As shown in FIGS. 6 and 7, the filter coefficient generating unit 107 generates filter coefficients for the first subframe image according to equations (4) such that the coordinates (X, Y) of the reference point become (0, 0). The filter coefficient generating unit 107 outputs the generated filter coefficients to the LPF 101. This embodiment may use, as filter coefficients, the coefficient values at the respective coordinates obtained by substituting the respective coordinates of filter coefficients into a two-dimensional Gaussian function held in advance in the apparatus or acquired externally.

The filter coefficient generating unit 107 obtains filter coefficients by repeating the above processing using the motion vectors estimated by the motion vector detecting unit 106 for the respective pixels of the input image. That is, the filter coefficient generating unit 107 obtains filter coefficients for the respective pixels of each subframe image. The LPF 101 acquires the filter coefficients for the first subframe image from the filter coefficient generating unit 107. The LPF 101 generates the low-frequency enhanced image L by sequentially performing filter computation for the respective pixels of the first subframe image (i=1) using the acquired filter coefficients.

FIG. 8 shows an example of a filter function in this embodiment. FIG. 8 schematically shows the filter function for the second subframe image (i=2) when motion vector V(x, y)= (+2, +2) and N=2. FIG. 9 shows an example of filter coefficients in this embodiment. FIG. 9 shows filter coefficients for the second subframe image (i=2) when motion vector V(x, y)=(+2, +2) and N=2.

As shown in FIGS. 8 and 9, the filter coefficient generating unit 107 generates filter coefficients for the second subframe image according to equations (4) such that the coordinates (X, Y) of the reference point become (−1, −1). The filter coefficient generating unit 107 then outputs the generated filter coefficients to the LPF 101. In this embodiment, the filter coefficient generating unit 107 translates the two-dimensional Gaussian function, held in advance in the apparatus or acquired externally, by −1 in the X-axis direction and by −1 in the Y-axis direction. The filter coefficient generating unit 107 may use, as filter coefficients, the coefficient values obtained by substituting the respective coordinates of filter coefficients into the translated Gaussian function.

The filter coefficient generating unit 107 obtains filter coefficients by repeating the above processing using the motion vectors estimated by the motion vector detecting unit 106 for the respective pixels of the input image, as in the case of the first subframe image. That is, the filter coefficient generating unit 107 obtains filter coefficients for the respective pixels of the input image and the second subframe image obtained by replicating the input image. The LPF 101 acquires the filter coefficients for the second subframe image from the filter coefficient generating unit 107. The LPF 101 generates the low-frequency enhanced image L by sequentially performing filter computation for the respective pixels of the second subframe image (i=2) using the acquired filter coefficients.

Figure 10:
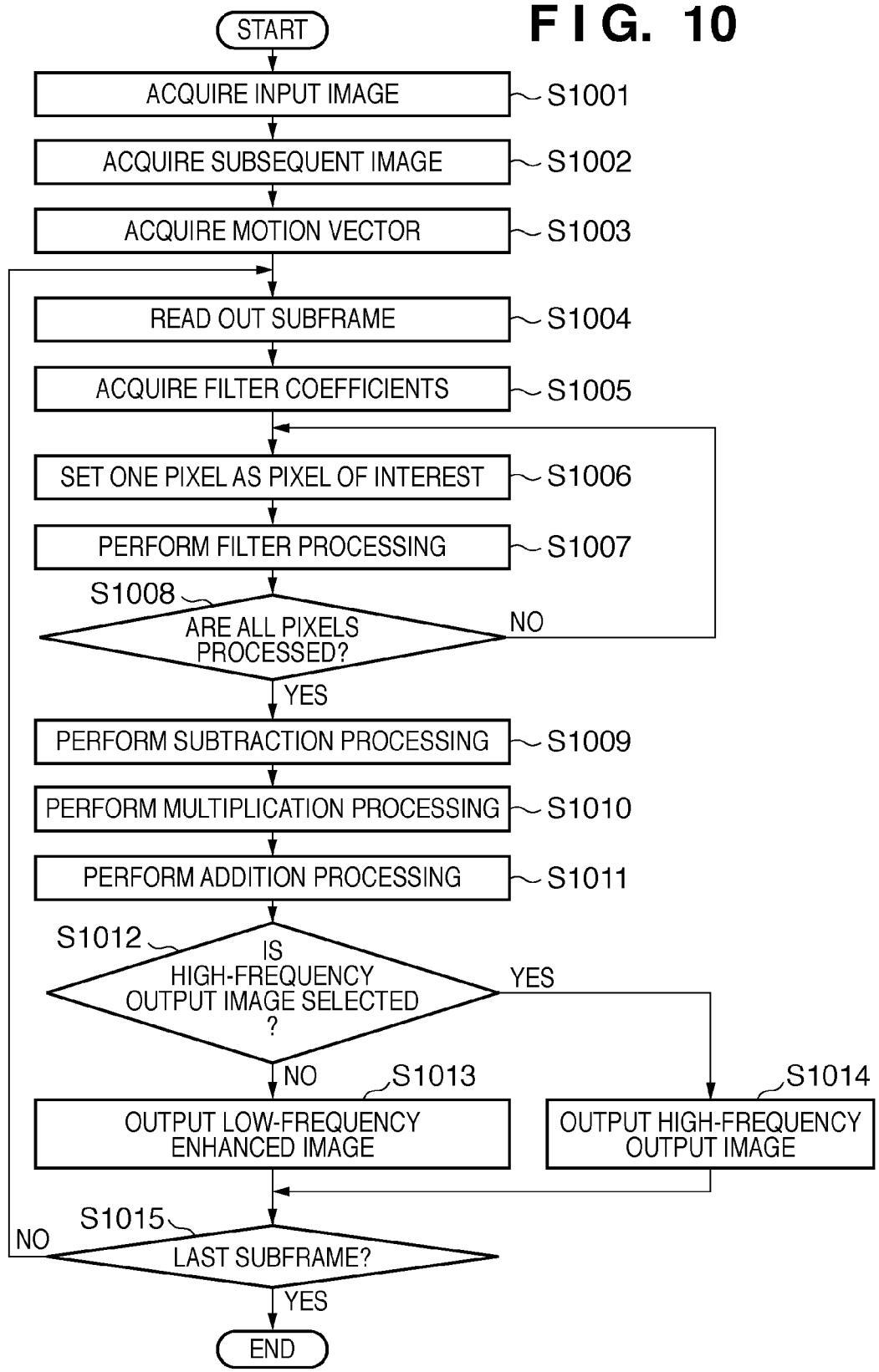
FIG. 10 is a flowchart showing processing in the first embodiment.

Processing in the first embodiment will be described below with reference to the flowchart of FIG. 10. First of all, the frame rate converting unit 100 acquires a frame image contained in moving image data as an input image (step S1001). The frame rate converting unit 100 then acquires the image of the frame following the input image as a subsequent image (step S1002).

The motion vector detecting unit 106 acquires the input image and the subsequent image from the frame rate converting unit 100. The motion vector detecting unit 106 then detects the moving amount of an object indicated by each pixel of the input image between the input image and the subsequent image. The motion vector detecting unit 106 generates the moving amount as a motion vector V(x, y) concerning each pixel of the input image (step S1003). In the processing in step S1003, the motion vector detecting unit 106 may estimate a moving amount by using a plurality of frame images or estimate a moving amount by using subframe images.

Subsequently, the frame rate converting unit 100 reads out the acquired input image at a clock (frequency) N times that of moving image data. The frame rate converting unit 100 outputs the readout image as a subframe image together with a subframe number i (step S1004). The filter coefficient generating unit 107 generates filter coefficients used for filter computation by the LPF 101 based on the motion vector V(x, y), the subframe image count N, and the subframe image number i (step S1005). The subframe image count N may be stored in the apparatus in advance or input externally. The subframe image number i is acquired from the frame rate converting unit 100.

The LPF 101 sets one pixel in the subframe image output from the frame rate converting unit 100 as a pixel of interest (step S1006). The LPF 101 performs filter computation for the pixel of interest by using the filter coefficient acquired from the filter coefficient generating unit 107, and acquire a converted the pixel value (step S1007). The LPF 101 then determines whether it has set all the pixels of the subframe image output from the frame rate converting unit 100 as pixels of interest in step S1006 (step S1008). If the LPF 101 has not set all the pixels as pixels of interest, the process returns to step S1006, in which the LPF 101 sets the next pixel as a pixel of interest. If the LPF 101 has set all the pixels as pixels of interest, the process advances to step S1009. With the processing in steps S1006 to S1008, the LPF 101 generates the low-frequency enhanced image L by performing filter computation and pixel value conversion.

The subtracter 102 acquires the low-frequency enhanced image L from the LPF 101. The subtracter 102 then generates the high-frequency enhanced image H according to equation (2) (step S1009). The multiplier 103 multiplies each pixel value of the high-frequency enhanced image H acquired from the subtracter 102 by ((N−a)/a). The multiplier 103 then outputs the image having undergone the multiplication processing (step S1010).

The adder 104 acquires the image processed by the multiplier 103. The adder 104 acquires the subframe image output from the frame rate converting unit 100 in step S1004. The adder 104 then generates the high-frequency output image SH whose high-frequency components are enhanced according to equation (3) (step S1011).

The switch 105 determines to select the high-frequency output image or the low-frequency enhanced image (step S1012). The determination criterion to be set is not specifically limited, as described above. The switch 105 may alternatively select the low-frequency enhanced image and the high-frequency output image. Alternatively, the switch 105 may consecutively select a high-frequency output images, and then consecutively select (N−a) low-frequency enhanced images. The switch 105 may select a high-frequency output images and (N−a) low-frequency enhanced images during repetitive execution of steps S1004 to S1015. If the switch 105 selects a low-frequency enhanced image in step S1012, the switch 105 acquires the low-frequency enhanced image L from the LPF 101 and outputs it (step S1013). If the switch 105 selects a high-frequency output image in step S1012, the switch 105 acquires the high-frequency output image SH from the adder 104 and outputs it (step S1014).

Finally, the frame rate converting unit 100 determines whether N subframe images of the acquired image have been output (step S1015). If N subframe images have not been output, the process returns to step S1004. If N subframe images have been output, the frame rate converting unit 100 terminates the processing for the acquired image.

As described above, the filter coefficient generating unit 107 generates filter coefficients for filter processing for the second and subsequent subframe images by moving the reference point of the filter function in the exact opposite direction to the detected moving direction. Using these filter coefficients can reduce the image lag in an area with motion which occurs in the second method "spatial frequency splitting".

Figure 11:
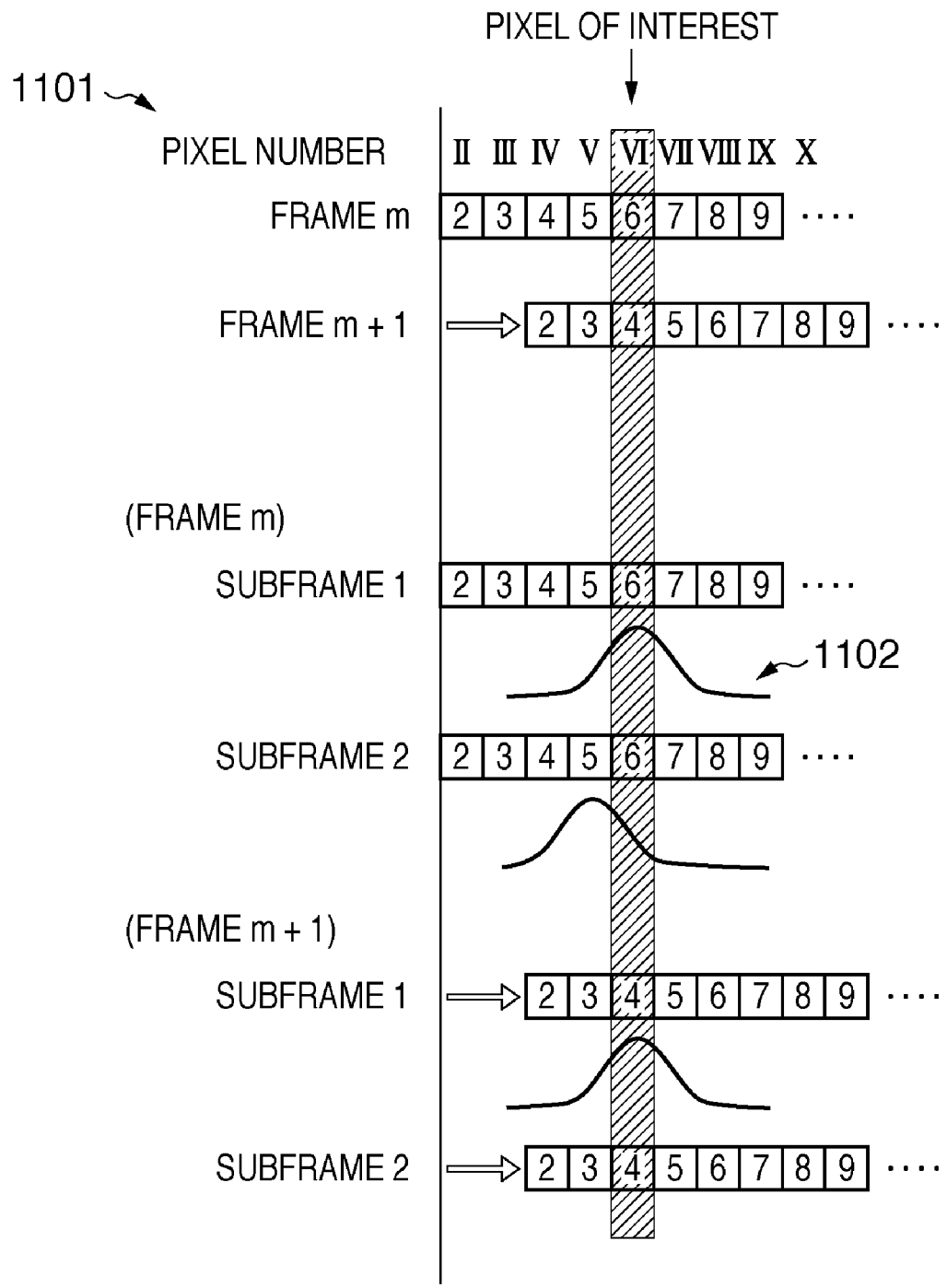
FIG. 11 is a view for explaining effects in the first embodiment.

FIG. 11 is a view for explaining an effect in this embodiment. In FIG. 11, 1101 schematically shows a movement of an image formed of the numbers "23456789" to the right (in the x direction) between frames by two pixels. For the sake of descriptive convenience, assume that each pixel represents one number. Pixel numbers (II to X) are assigned to the respective pixels. In FIG. 11, 1102 indicates each subframe image obtained by doubling the speed (N=2) of each frame image in 1101 in FIG. 11 by frame rate conversion processing. In FIG. 11, 1102 indicates an example of the filter function generated based on this embodiment when the grayed pixels are set as pixels of interest. FIG. 11 illustrates one-dimensional images for the sake of simplicity.

Referring to FIG. 11, the motion vector V(x, y) of the pixel of interest (pixel number VI) between a frame image m and a frame image m+1 is (+2, 0). In this case, with the application of equations (4), the reference point of the first subframe image (i=1) has coordinates (X, Y)=(0, 0), and the reference point of the second subframe image (i=2) has coordinates (X, Y)=(−1, 0).

The filter coefficient to be applied to the pixel number VI of the first subframe image of the frame image m is obtained from a filter function with a weight being assigned to the pixel value corresponding to the pixel number VI. The filter coefficient to be applied to the pixel number VI of the second subframe image of the frame image m is obtained from a filter function with a weight being assigned to the pixel value corresponding to the pixel number V. In addition, the filter coefficient to be applied to the pixel number VI of the first subframe image of the frame image m+1 is obtained from a filter function with a weight being assigned to the pixel number VI because (X, Y)=(0, 0) according to equations (4).

The second subframe image of the frame image m is displayed between the first subframe image of the frame image m and the first subframe image of the frame image m+1. For this reason, the second subframe image of the frame image m may be an intermediate image between the first subframe image of the frame image m and the first subframe image of the frame image m+1.

Consider a case in which a low-frequency enhanced image is generated by applying the same filter function as that for the first subframe image to the second subframe image. A low-frequency enhanced image used to generate the second subframe image of the frame m is the same as that used to generate the first subframe image of the frame m. That is, the same image as the first subframe image of the frame m is displayed again between the frame m and the frame m+1 with a time lag, although they have different enhanced frequency components. For this reason, the second subframe image of the frame m is visually perceived as an image lag of the first subframe image of the frame m.

For example, a case in which filter processing is performed for the pixels corresponding to the pixel number VI in FIG. 11 will be described with reference to FIG. 11. A filter function with weights being assigned to the pixel values corresponding to the pixel number VI is used for the first and second subframe images of the frame image m. Therefore, regarding both the first and second subframe images of the frame image m, pixel values with weights being assigned to the numerical value "6" are generated by filter processing, thereby generating the low-frequency enhanced image L. A filter function with a weight being assigned to the pixel number VI is also used for the first subframe image of the frame image m+1. Regarding the first subframe image of the frame image m+1 as well, the low-frequency enhanced image L is generated by generating a pixel value with a weight being assigned to the numerical value "4" by filter processing. However, it would be better to perform filter processing for the second subframe image of the frame image m, displayed between the frame m and the frame m+1, with a weight being assigned to a numerical value existing between the numerical value "6" and the numerical value "4".

According to this embodiment, regarding the second subframe image of the frame m, it is possible to perform filter processing for the pixel of interest by using a filter function with a weight being assigned to the pixel value corresponding to the pixel number V, in other words, the numerical value "5".

That is, it is possible to reduce the image lag adaptively in accordance with motion. According to the second method "spatial frequency splitting", high-frequency components greatly associated with motion blurring are concentrated on one of a plurality of subframes. In addition, this method distributes low-frequency components which are not greatly associated with motion blurring to other subframe, or to a plurality of subframes, and displays them. In this manner, "spatial frequency splitting" can reduce motion blurring in a moving image recognized by a viewer. In conventional "spatial frequency splitting", however, since each subframe does not reflect the difference of each time to be displayed, an image lag occurs in an area with motion. As described above, according to this embodiment, when the frequency components of the respective subframes are obtained, a motion vector is referred to. This makes it possible to generate subframes each properly reflecting the difference of each time to be displayed. This embodiment can therefore reduce an image lag in an area with motion which occurs in the second method "spatial frequency splitting".

In this embodiment, in particular, low-frequency enhanced images are made to reflect the difference of each time to be displayed. Therefore, regarding a plurality of subframes generated from one frame, a better result is obtained when many high-frequency enhanced images (high-frequency output images) are selected as subframes to be displayed earlier, and many low-frequency enhanced images are selected as subframes to be displayed later. For example, in double-speed display, it is possible to display a high-frequency output image as the first subframe and a low-frequency enhanced image as the second subframe. When displaying in four-times higher frequency than an input moving image, it is possible to display a high-frequency output image as the first subframe and low-frequency enhanced images as the second to fourth subframes or to display high-frequency output images as the first and second subframes and low-frequency enhanced images as the third and fourth sub frames.

According to the method of this embodiment, after the LPF 101 performs filter processing while changing filter coefficients, it is possible to generate subframe images by using only simple addition, subtraction, and multiplication. For this reason, unlike the first method "frame (field) interpolation based on motion compensation", it is not necessary to generate an intermediate image by using the image data of adjacent frames. Therefore, the method of this embodiment can generate subframe images with a small amount of calculation.

<Modification>

In the first embodiment, the filter coefficient generating unit 107 generates filter coefficients. In addition, the LPF 101 performs filter processing based on the generated filter coefficients. The filter coefficient generating unit 107 acquires filter coefficients by moving a filter function. Using these filter coefficients allows the filter to be applied to pixels around the pixel position Q, where the position Q is spaced apart from the pixel position P in the input image which corresponds to the pixel position P of interest in a replicated image by a predetermined distance in the direction opposite to the motion vector.

However, using the pixel position P of the input image which corresponds to the pixel position P of interest in the subframe image (replicated image) can specify the pixel position Q spaced apart by a predetermined distance in the opposite direction to the motion vector. It is possible to apply the filter to pixels around the specified pixel position Q without using the filter coefficients generated by the filter coefficient generating unit 107. That is, this modification uses the coordinates calculated as the coordinates of a reference point of the filter function as the center coordinates of pixels to which the filter is applied.

This modification will be described in detail below. Although the arrangement of the modification is almost the same as that of the first embodiment, the filter coefficient generating unit 107 does not exist. A motion vector detecting unit directly inputs a motion vector to the LPF 101. The LPF 101 changes the application range of the filter in accordance with the motion vector. The LPF 101 calculates the coordinates of a reference point according to equations (4) like the filter coefficient generating unit 107 in the first embodiment. The first embodiment uses a calculated reference point as a reference point of a filter function. However, this modification uses a calculated reference point to obtain the center point of a pixel group to which the filter is applied.

The LPF 101 sets one pixel of a subframe image to be processed as a pixel of interest. This pixel position is represented by P. The LPF 101 then specifies, as the coordinate position Q, the position of a reference point calculated when the pixel position P of the input image which corresponds to the pixel position P of the subframe image is set as an origin point. If, for example, the coordinates (X, Y) of a reference point are (−1, 2), the LPF 101 specifies, as the coordinate point Q, the point which is moved from the pixel position P by 2 in the Y-axis negative direction and by 1 in the X-axis positive direction. The LPF 101 then applies the filter to pixels around the coordinate position Q. This modification does not use the filter coefficient generating unit which generates filter coefficients by moving a filter function. Instead of this unit, the modification applies the same filter to different positions of interest. More specifically, the LPF 101 determines an LPF output value according to equation (1). At this time, the LPF 101 obtains an LPF output value such that the coordinates of the coordinate position Q become An(0, 0). The LPF 101 sets the obtained LPF output value as the converted pixel value of the pixel of interest (pixel position P) of the subframe image. The LPF 101 can obtain a low-frequency enhanced image by performing this processing for each pixel of the subframe image.

Second Embodiment

In the first embodiment, the filter coefficient generating unit 107 calculates the coordinates (X, Y) of a reference point according to equations (4). However, the way of obtaining a reference point is not limited to this method. In some cases, the absolute value of each component of a motion vector V(x, y) greatly exceeds the filter size (kernel size) of the filter function. Assume that the absolute value of each component of a motion vector is very large. In this case, when a reference point moves, the filter shape may become unbalanced because, for example, the maximum size of the filter size (kernel size) is limited on a circuit. That the filter shape becomes unbalanced is that, for example, the filter size becomes asymmetric about the center of the filter function in the x direction. It is possible to use the asymmetric function. However, it is also possible to impose a limitation on the moving amount of a reference point.

In the second embodiment, a limitation may be imposed on the moving amount of a reference point by any method as long as the absolute value of the moving amount of the reference point is smaller than that in the first embodiment. That is, the second embodiment may determine a moving amount according to inequalities (5):

$$|X| \leq |(i-1) \times ((-Vx)/N)|$$

$$|Y| \leq |(i-1) \times ((-Vy)/N)| \qquad (5)$$

At this time, the coordinates (0, 0) are the center coordinates of the filter function. Let Vx be the x component of a motion vector V(x, y), and Vy be the y component of the motion vector V(x, y). |X|, |Y|, |(i−1)|×((−Vx)/N)| and |(i−1)|×((−Vy)/N)| indicate the absolute values of X, Y, ((i−1)×((−Vx)/N)) and ((i−1)×((−Vy)/N)).

For example, the coordinate value obtained according to equations (4) may be simply reduced to half. Alternatively, it is possible to obtain the square root of the absolute value of the coordinate value obtained according to equations (4). According to another method, it is possible to improve the balance of the filter shape by reducing the filter size. For example, after limiting the moving amount of a reference point according to inequalities (5), the filter function may be adaptively changed. For example, the variance of the filter function may be changed in accordance with the filter size on the circuit.

Setting a reference point according to, for example, inequalities (5) as in this embodiment instead of applying equations (4) makes it possible to reduce an image lag in an area with motion which occurs in the second method "spatial frequency splitting" as in the first embodiment. It is not necessary to generate an intermediate image by using the image data of adjacent frames as in the first method "frame (field) interpolation based on motion compensation"; it is possible to generate a subframe image with a small amount of calculation as in the first embodiment.

Third Embodiment

In the first and second embodiments, the LPF 101 performs spatial frequency component splitting. In the third embodiment, a high-pass filter (to be referred to as an HPF hereinafter) performs spatial frequency component splitting. An HPF may be, for example, a filter function represented by a Laplacian filter which determines filter coefficients based on a spatial second derivative.

Figure 12:
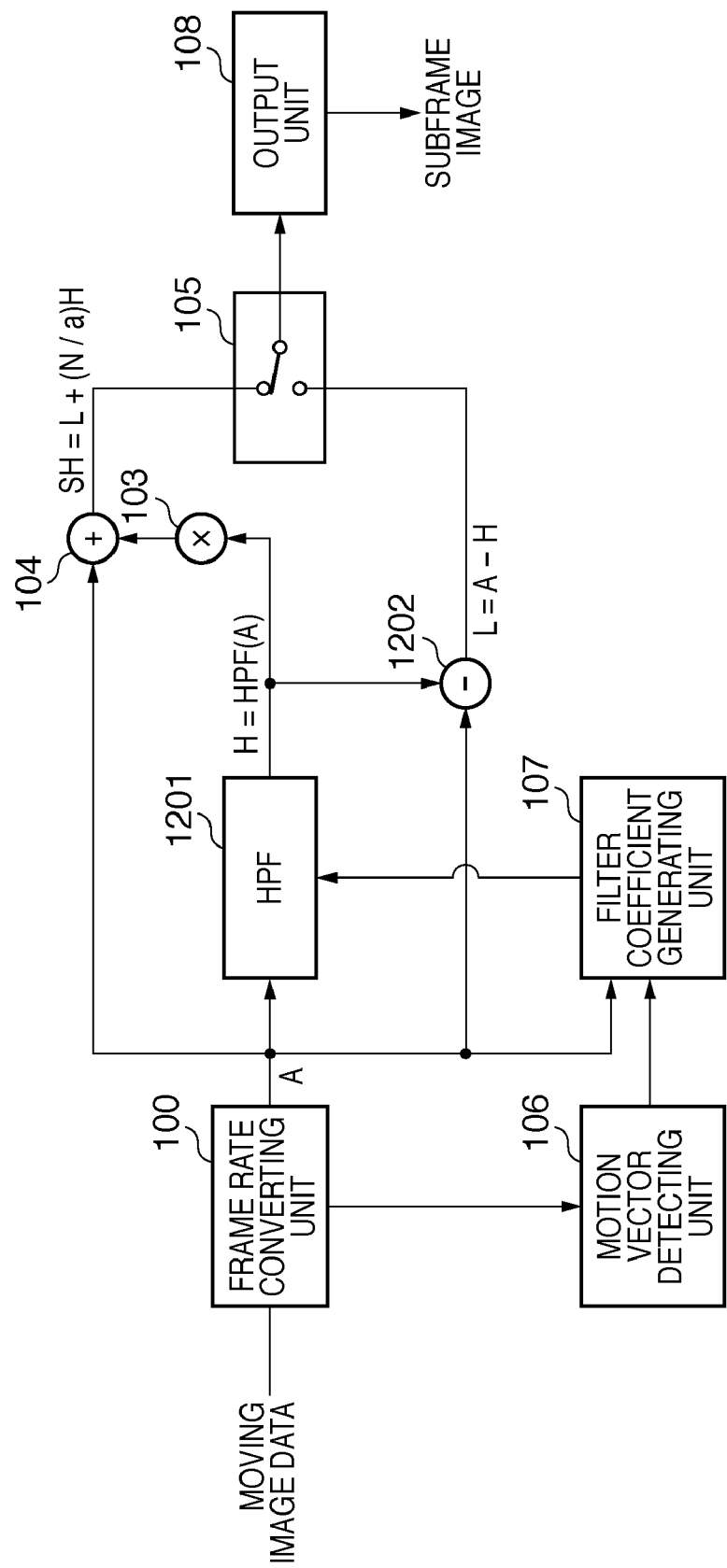
FIG. 12 is a block diagram showing the arrangement of an image display apparatus according to the third embodiment.
Figure 13:
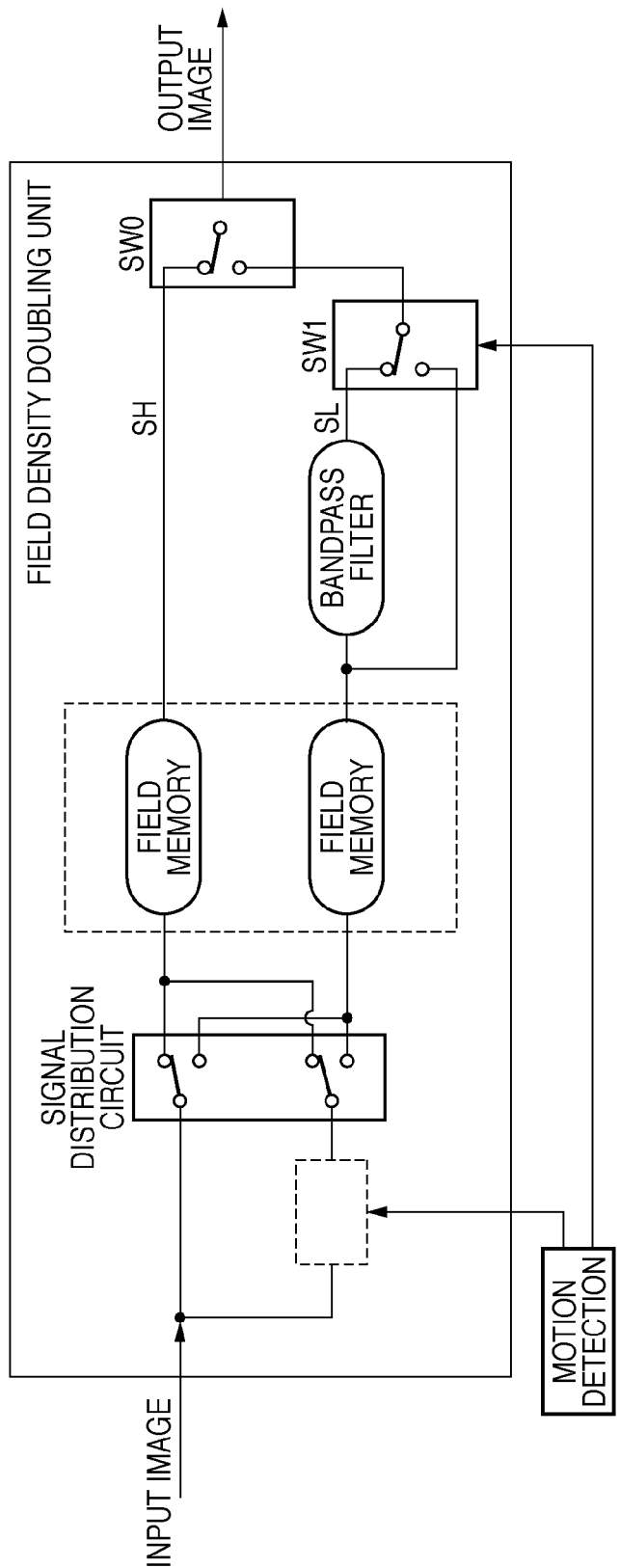
FIG. 13 is a block diagram schematically showing a conventional image display apparatus.
Figure 14:
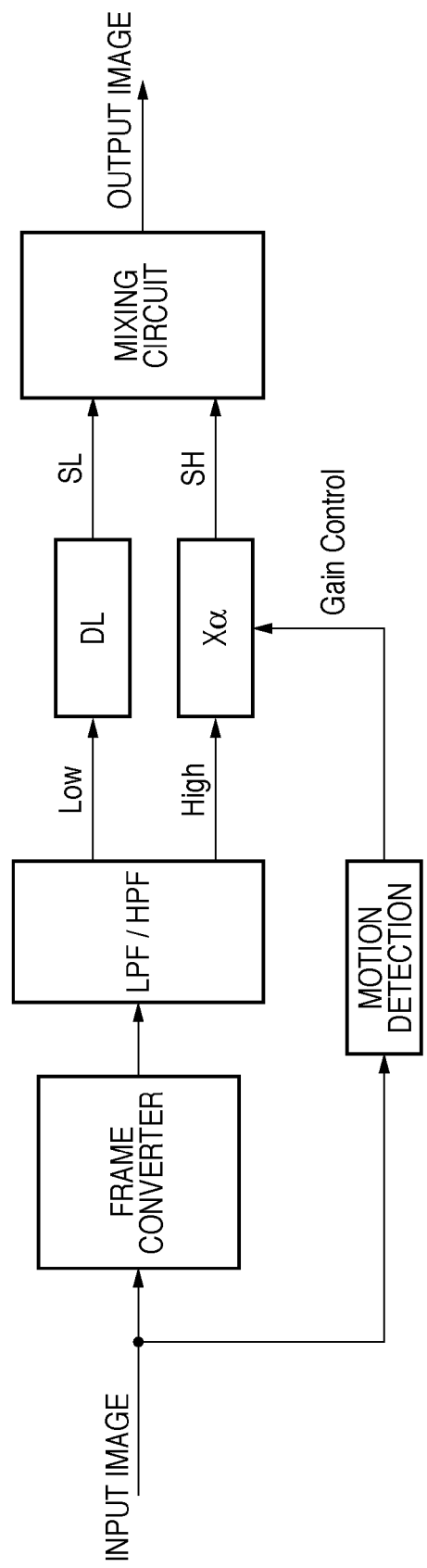
FIG. 14 is a block diagram schematically showing a conventional image display apparatus.
Figure 15:
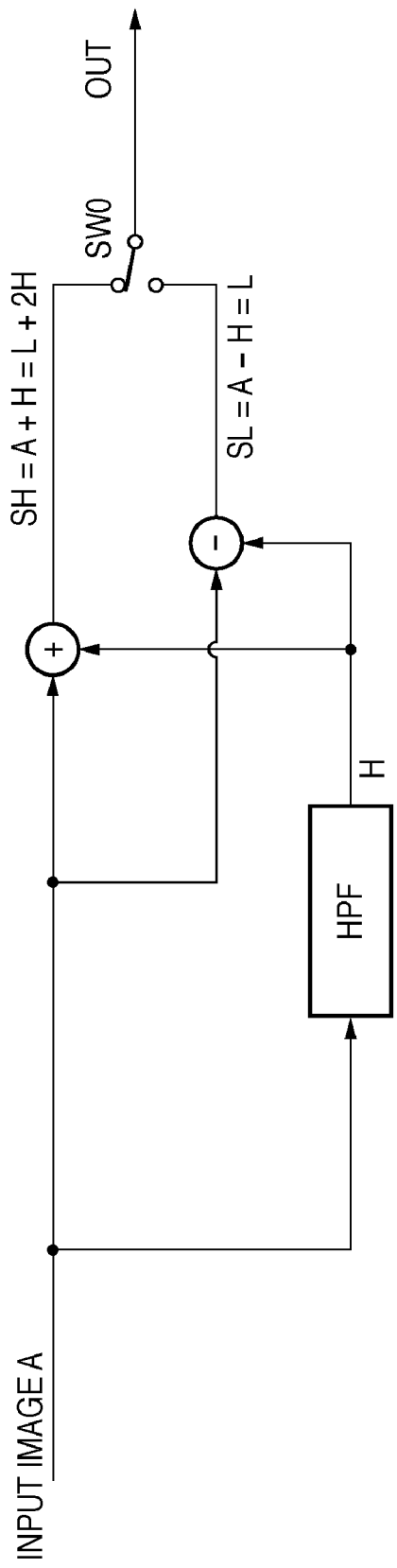
FIG. 15 is a block diagram schematically showing a conventional image display apparatus.

FIG. 12 is a block diagram showing the arrangement of an image display apparatus according to the third embodiment. The same reference numerals as in FIG. 1 denote the same constituent elements as those in the first embodiment. In the third embodiment, the operations of a frame rate converting unit 100, motion vector detecting unit 106, and output unit 108 are the same as those in the first embodiment.

Unlike in the first embodiment, a filter coefficient generating unit 107 outputs filter coefficient used by an HPF 1201. The filter coefficient generating unit 107 obtains filter coefficients based on a basic filter function designed to cut off (filter) lower frequencies. However, as in the first embodiment, the filter coefficient generating unit 107 obtains filter coefficients by translating the basic filter function in accordance with the motion vector acquired from the motion vector detecting unit 106. More specifically, the filter coefficient generating unit 107 calculates coordinates (X, Y) of a reference point of the filter function according to equations (4) in the first embodiment or inequalities (5) in the second embodiment. The filter coefficient generating unit 107 then obtains filter coefficients by translating the basic filter function in accordance with the coordinates of the reference point.

An HPF 1201 (alternative generating unit) cuts off (filters) lower spatial frequencies, than a limit frequency, of a subframe image A acquired from the frame rate converting unit 100 by using the filter coefficients generated by the filter coefficient generating unit 107. In this manner, the HPF 1201 generates a high-frequency enhanced image H. Reference numeral 1202 denotes a subtracter, which subtracts the high-frequency enhanced image H generated by the HPF 1201 from the subframe image A according to equation (6). In this manner, the subtracter 1202 calculates a low-frequency enhanced image L.

$$L=A-H \qquad (6)$$

The operations of an multiplier 103, adder 104, and switch 105 using the low-frequency enhanced image L and the high-frequency enhanced image H are the same as those in the first embodiment.

Like the first and second embodiments, this embodiment can reduce an image lag in an area with motion which occurs in the second method "spatial frequency splitting". It is not necessary to generate an intermediate image by using the image data of adjacent frames as in the first method "frame (field) interpolation based on motion compensation"; it is possible to generate a subframe image with a small amount of calculation as in other embodiments.

Fourth Embodiment

In each embodiment described above, the respective units constituting the apparatus shown in FIG. 1 or 12 are implemented by hardware. However, the respective units constituting the apparatus shown in FIG. 1 or 12 are implemented by software. In this case, the software is held in various types of storage devices which a computer has. When the CPU executes this software, the computer implements the function of each unit shown in FIG. 1 or 12.

Figure 16:
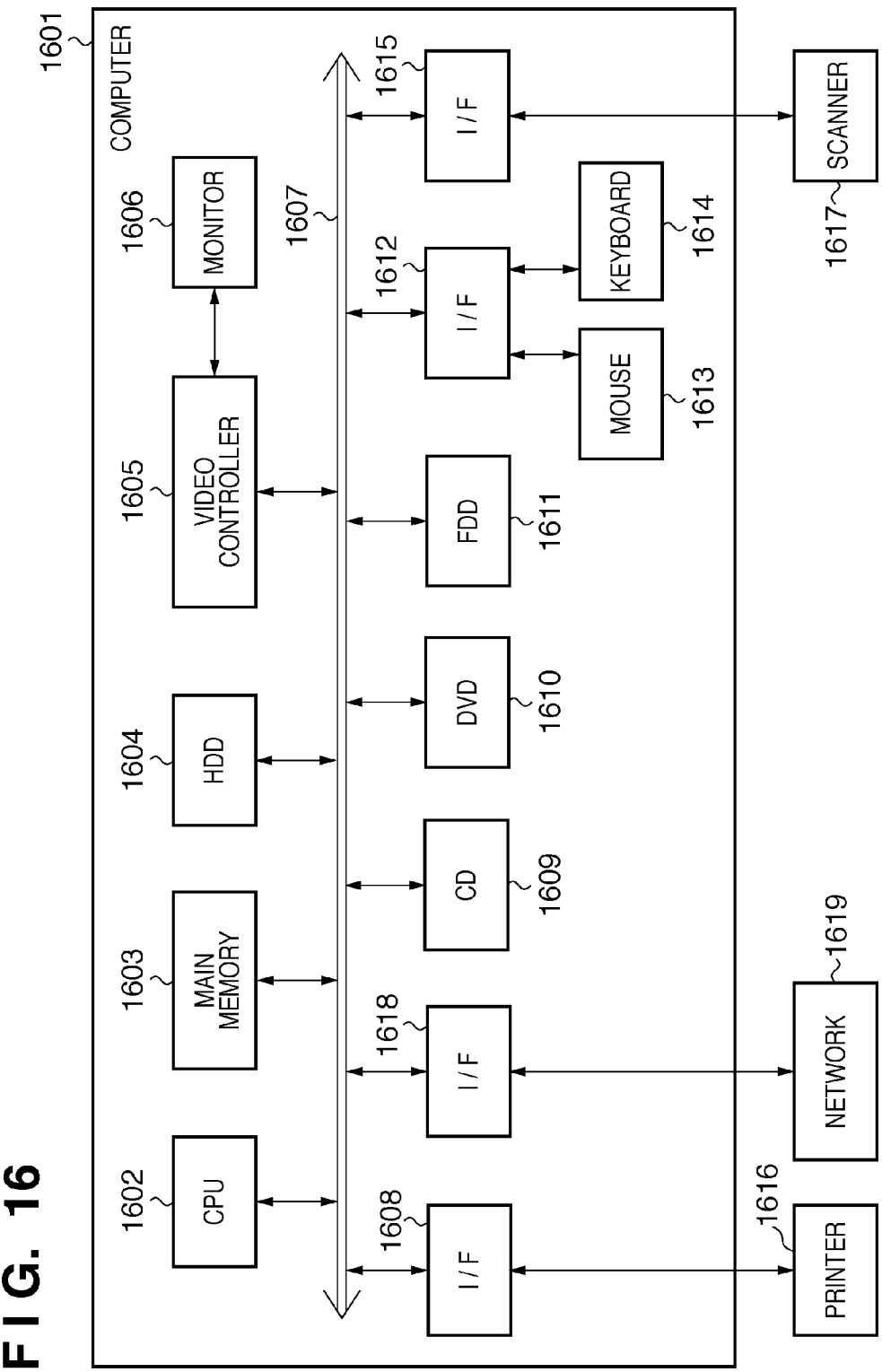
FIG. 16 is a block diagram showing the electrical arrangement of a computer according to the fourth embodiment.

FIG. 16 is a block diagram showing the hardware arrangement of the computer to which this embodiment can be applied. A computer 1601 is a general-purpose information processing apparatus such as a personal computer in widespread use. In the computer 1601, the respective blocks to be described later are connected to each other via a bus 1607 and can exchange various data.

Depending on the apparatus to which the computer 1601 is applied, not all the constituent elements shown in FIG. 16 are necessary. Therefore, some of the constituent elements shown in FIG. 16 can be omitted as needed. In addition, the constituent elements shown in FIG. 16 may be replaced by hardware having equivalent functions. Furthermore, the computer 1601 may be constituted by a plurality of computer units.

Referring to FIG. 16, reference numeral 1602 denotes a CPU, which controls the overall computer 1601 by using computer programs and data loaded in a main memory 1603. The CPU 1602 executes each processing described above which is performed by an image processing apparatus to which the computer 1601 is applied. The main memory 1603 is typically a RAM. The main memory 1603 has an area for temporarily storing programs and data loaded from various types of storage devices. The storage devices include an HDD (Hard Disk Drive) 1604, a CD drive 1609, a DVD drive 1610, and an FDD (Floppy® Disk Drive) 1611. The main memory 1603 further has an area for temporarily storing image data acquired from a scanner 1617 via an I/F (Interface) 1615. In addition, the main memory 1603 has a work area which is used by the CPU 1602 to execute various kinds of processes. The main memory 1603 can provide various kinds of information recording locations including the above areas, as needed.

The HDD 1604 holds an OS (Operating System), various kinds of images (including document images), and the like. The HDD 1604 holds programs and data which make the CPU 1602 control the functions of the respective units shown in FIG. 16. The HDD 1604 also holds programs and data which make the CPU 1602 execute each processing described above which is executed by the apparatus to which the computer 1601 is applied. The programs and data held in the HDD 1604 are loaded into the main memory 1603 under the control of the CPU 1602, as needed, and are processed by the CPU 1602. Note that the HDD 1604 may hold some of the pieces of information described as those stored in the main memory 1603.

Reference numeral 1605 denotes a video controller. The video controller 1605 transmits display data such as image data and character data received from the main memory 1603, the HDD 1604, and the like as signals to a monitor 1606. The monitor 1606 includes a CRT and a liquid crystal display. The monitor 1606 displays images, characters, and the like based on signals received from the video controller 1605.

Reference numeral 1608 denotes an I/F for connecting a printer 1616 to the computer 1601. The computer 1601 transmits print data to the printer 1616 via the I/F 1608. The computer 1601 can also receive the state information of the printer 1616, transmitted by the printer 1616, via the I/F 1608. Reference numeral 1609 denotes a CD drive, which reads out programs and data recorded on CDs as recording media. The CD drive 1609 also transmits readout programs and data to the HDD 1604, the main memory 1603, and the like.

Reference numeral 1610 denotes a DVD drive, which reads out programs and data recorded on DVDs as recording media. The DVD drive 1610 also transmits readout programs and data to the HDD 1604, the main memory 1603, and the like. Reference numeral 1611 denotes an FDD, which reads out programs and data recorded on Floppy® disks as recording media. The FDD 1611 also transmits readout programs and data to the HDD 1604, the main memory 1603, and the like.

Reference numerals 1613 and 1614 denote a mouse and a keyboard, respectively, as operation input devices. The user of the computer 1601 can input various kinds of instructions to the CPU 1602 by operating the mouse 1613 and the keyboard 1614. Reference numeral 1612 denotes an I/F for connecting the keyboard 1614 and the mouse 1613 to the bus 1607. The operation instructions input by the user via the mouse 1613 and the keyboard 1614 are transmitted as signals to the CPU 1602 via the I/F 1612.

Reference numeral 1615 denotes an I/F for connecting the scanner 1617, which generates image data by reading documents, films, and the like, to the computer 1601. The image data generated by the scanner 1617 is transmitted to the HDD 1604, the main memory 1603, and the like via the I/F 1615. Reference numeral 1618 denotes an I/F for exchanging information with electronic devices such as other computers. Information including image data acquired from a network 1619 in response to an instruction from the CPU 1602 is transmitted to the HDD 1604, the main memory 1603, and the like via the I/F 1618.

Other Embodiments

The four embodiments have been described above. However, the above embodiments can be variously changed within the spirit and scope of the present invention. Although each filter function has been described as a function based on a Gaussian function, any type of filter function may be used. It is possible to acquire filter coefficients by translating a filter function as a base in accordance with equations (4) or inequalities (5).

As has been described above, the image display apparatus according to the present invention can reduce an image lag in an area with motion which occurs in the second method "spatial frequency splitting". It is not necessary to generate an intermediate image by using the image data of adjacent frames as in the first method "frame (field) interpolation based on motion compensation"; it is possible to generate a subframe image with a small amount of calculation.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-132424, filed Jun. 1, 2009 which is hereby incorporated by reference herein in its entirety.

What is claimed is:

1. An image processing apparatus which processes a moving image comprising successive frame images, comprising:
a unit configured to obtain a frame image of interest as an input image, and to obtain a frame image subsequent to the frame image of interest as a subsequent image;
a unit configured to obtain N replicated images from the input image;
a generating unit configured to generate a low-frequency enhanced image whose low-frequency component is enhanced, from the replicated image by using a filter for enhancing a low-frequency component;
a subtraction unit configured to generate a high-frequency enhanced image whose high-frequency component is enhanced, from the low-frequency enhanced image and the replicated image;
a synthesizing unit configured to generate a high-frequency output image by synthesizing the high-frequency enhanced image and the low-frequency enhanced image at a predetermined ratio; and
an output unit configured to select and output one of the low-frequency enhanced image and the high-frequency output image in place of each of the replicated images,
said generating unit comprising
a unit configured to obtain a motion vector of an object depicted in the input image and the subsequent image, and
a filter unit configured to generate the low-frequency enhanced image, when processing a pixel at a pixel position P in the replicated image, by performing, for each pixel position in the replicated image, a process of specifying a pixel position Q spaced apart from the pixel position P in the replicated image by a predetermined distance in an opposite direction to the motion vector, a process of applying the filter to pixels around the specified pixel position Q in the replicated image, to obtain a pixel value at the pixel position P in the low-frequency enhanced image.

2. The apparatus according to claim 1, wherein said subtraction unit generates, as the high-frequency enhanced image, an image obtained by subtracting each pixel value in the low-frequency enhanced image from a corresponding pixel value of the input image,
and when said output unit outputs a high-frequency output images and the (N−a) low-frequency enhanced images for one input image, said synthesizing unit generates, as the high-frequency output image, an image obtained by adding a value obtained by multiplying each pixel value of the high-frequency enhanced image by (N−a) to a corresponding pixel value of the low-frequency enhanced image.

3. The apparatus according to claim 1, wherein when processing an i:th replicated image for the input image, said filter unit acquires a motion vector indicating a motion of the pixel position P, acquires, as a moving amount, a vector having a value obtained by multiplying a value of the motion vector by (−(i−1)/N), and specifies a position moved from the pixel position P by the moving amount as the pixel position Q.

4. The apparatus according to claim 3, wherein said filter unit acquires values, which are obtained by applying the filter to pixels around the pixel position Q, by applying filter coefficients to pixels around the pixel position P, which filter coefficients are obtained by moving a filter function, which provides coefficient values of the filter, by the moving amount.

5. An image processing apparatus which processes a moving image comprising successive frame images, comprising:
a unit configured to obtain a frame image of interest as an input image, and to obtain a frame image subsequent to the frame image of interest as a subsequent image;
a unit configured to obtain N replicated images from the input image;
an alternative generating unit configured to generate a high-frequency enhanced image whose high-frequency component is enhanced, from the replicated image by using a filter for enhancing a high-frequency component;
a unit configured to generate a low-frequency enhanced image whose low-frequency component is enhanced, from the high-frequency enhanced image and the replicated image;
a unit configured to generate a high-frequency output image by synthesizing the high-frequency enhanced image and the low-frequency enhanced image at a predetermined ratio; and
a unit configured to select and output one of the low-frequency enhanced image and the high-frequency output image in place of each of the replicated images,
said alternative generating unit comprising
a unit configured to obtain a motion vector of an object depicted in the input image and the subsequent image, and
a unit configured to generate the high-frequency enhanced image, when processing a pixel at a pixel position P in the replicated image, by performing, for each pixel position in the replicated image, a process of specifying a pixel position Q spaced apart from the pixel position P in the replicated image by a predetermined distance in an opposite direction to the motion vector, a process of applying the filter to pixels around the specified pixel position Q in the replicated image, to obtain a pixel value at the pixel position P in the high-frequency enhanced image.

6. An image processing method executed by an image processing apparatus comprising a unit configured to process a moving image comprising successive frame images, comprising:

a step of obtaining a frame image of interest as an input image, and obtaining a frame image subsequent to the frame image of interest as a subsequent image;

a step of obtaining N replicated images from the input image;

a generating step of generating a low-frequency enhanced image whose low-frequency component is enhanced, from the replicated image by using a filter for enhancing a low-frequency component;

a step of generating a high-frequency enhanced image whose high-frequency component is enhanced, from the low-frequency enhanced image and the replicated image;

a step of generating a high-frequency output image by synthesizing the high-frequency enhanced image and the low-frequency enhanced image at a predetermined ratio; and an output step of selecting and outputting one of the low-frequency enhanced image and the high-frequency output image in place of each of the replicated images, the generating step comprising a step of obtaining a motion vector of an object depicted in the input image and the subsequent image, and a filter step of generating the low-frequency enhanced image, when processing a pixel at a pixel position P in the replicated image, by performing, for each pixel position in the replicated image, a process of specifying a pixel position Q spaced apart from the pixel position P in the replicated image by a predetermined distance in an opposite direction to the motion vector, a process of applying the filter to pixels around the specified pixel position Q in the replicated image, to obtain a pixel value at the pixel position P in the low-frequency enhanced image.

7. An image processing method executed by an image processing apparatus comprising a unit configured to process a moving image comprising successive frame images, comprising:

a step of obtaining a frame image of interest as an input image, and obtaining a frame image subsequent to the frame image of interest as a subsequent image;

a step of obtaining N replicated images from the input image;

an alternative generating step of generating a high-frequency enhanced image whose high-frequency component is enhanced, from the replicated image by using a filter for enhancing a high-frequency component;

a step of generating a low-frequency enhanced image whose low-frequency component is enhanced, from the high-frequency enhanced image and the replicated image;

a step of generating a high-frequency output image by synthesizing the high-frequency enhanced image and the low-frequency enhanced image at a predetermined ratio; and a step of selecting and outputting one of the low-frequency enhanced image and the high-frequency output image in place of each of the replicated images, the alternative generating step comprising a step of obtaining a motion vector of an object depicted in the input image and the subsequent image, and a step of generating the high-frequency enhanced image, when processing a pixel at a pixel position P in the replicated image, by performing, for each pixel position in the replicated image, a process of specifying a pixel position Q spaced apart from the pixel position P in the replicated image by a predetermined distance in an opposite direction to the motion vector, a process of applying the filter to pixels around the specified pixel position Q in the replicated image, to obtain a pixel value at the pixel position P in the high-frequency enhanced image.

8. A non-transitory computer-readable storage medium, which stores a computer program for causing a computer to function as each unit of an image processing apparatus defined in claim 1.

9. A non-transitory computer-readable storage medium, which
stores a computer program for causing a computer to function as each unit of an image processing apparatus defined in claim 5.

* * * * *